United States Patent
Xing et al.

(10) Patent No.: US 11,159,185 B2
(45) Date of Patent: Oct. 26, 2021

(54) ANTENNA OF MOBILE TERMINAL AND SWITCHING METHOD THEREOF AND THE MOBILE TERMINAL

(71) Applicant: JRD Communication (Shenzhen) LTD., Shenzhen (CN)

(72) Inventors: Hongjuan Xing, Shenzhen (CN); Guofu Zheng, Shenzhen (CN); Hai Cai, Shenzhen (CN)

(73) Assignee: JRD Communication (Shenzhen) LTD., Shenzhen (CN)

(*) Notice: Subject to any disclaimer, the term of this patent is extended or adjusted under 35 U.S.C. 154(b) by 6 days.

(21) Appl. No.: 16/957,725

(22) PCT Filed: Dec. 26, 2018

(86) PCT No.: PCT/CN2018/124016
§ 371 (c)(1),
(2) Date: Jun. 25, 2020

(87) PCT Pub. No.: WO2019/129093
PCT Pub. Date: Jul. 4, 2019

(65) Prior Publication Data
US 2020/0373948 A1    Nov. 26, 2020

(30) Foreign Application Priority Data
Dec. 29, 2017 (CN) .......................... 201711476892.2

(51) Int. Cl.
*H01Q 3/24* (2006.01)
*H04B 7/04* (2017.01)
(Continued)

(52) U.S. Cl.
CPC ........... *H04B 1/0064* (2013.01); *H01Q 1/243* (2013.01); *H01Q 13/10* (2013.01); *H04B 7/0469* (2013.01)

(58) Field of Classification Search
CPC .. H01Q 1/24; H01Q 3/00; H01Q 3/24; H01Q 3/26; H01Q 21/04; H01Q 21/29;
(Continued)

(56) References Cited

U.S. PATENT DOCUMENTS

2009/0251383 A1    10/2009 Tani et al.
2018/0277963 A1*   9/2018 Desclos ................. H01Q 1/243
2021/0135335 A1*   5/2021 Suzuki .................... H01Q 13/10

FOREIGN PATENT DOCUMENTS

CN           104779437         7/2015
CN           107293855         10/2017
(Continued)

OTHER PUBLICATIONS

International Search Report and the Written Opinion dated Mar. 9, 2019 From the International Searching Authority Re. Application No. PCT/CN2018/124016 and Its Translation of Search Report Into English. (9 Pages).

*Primary Examiner* — Blane J Jackson (57) ABSTRACT

An antenna of a mobile terminal includes: a frame including four broken slots dividing the frame into a bottom frame, a top frame, a left frame, and a right frame; a two-input/two-output switch; a bottom antenna disposed in the bottom frame; a top antenna disposed in the top frame; a first high-frequency antenna disposed in the right frame; a second high-frequency antenna disposed in the left frame; a first selection switch disposed in a left side of the bottom frame; and a second selection switch disposed in a right side of the bottom frame; wherein the bottom antenna, the top antenna, the first high-frequency antenna, and the second high-frequency antenna are connected to the two-input/two-output switch. A switching method of the antenna of the mobile terminal and the mobile terminal are also provided.

20 Claims, 3 Drawing Sheets

(51) Int. Cl.
*H04B 1/00* (2006.01)
*H01Q 1/24* (2006.01)
*H01Q 13/10* (2006.01)
*H04B 7/0456* (2017.01)

(58) Field of Classification Search
CPC ........ H01Q 25/04; H04B 1/0064; H04B 7/04; H04B 7/0469
See application file for complete search history.

(56) References Cited

FOREIGN PATENT DOCUMENTS

| | | |
|---|---|---|
| CN | 108134199 | 6/2018 |
| WO | WO 2019/129093 | 7/2019 |

* cited by examiner

ANTENNA OF MOBILE TERMINAL AND SWITCHING METHOD THEREOF AND THE MOBILE TERMINAL

RELATED APPLICATIONS

This application is a National Phase of PCT Patent Application No. PCT/CN2018/124016 having International filing date of Dec. 26, 2018, which claims the benefit of priority of Chinese Patent Application No. 201711476892.2 filed on Dec. 29, 2017. The contents of the above applications are all incorporated by reference as if fully set forth herein in their entirety.

FIELD AND BACKGROUND OF THE INVENTION

The present disclosure relates to a technology field of mobile terminals, and more particularly to an antenna of a mobile terminal and a switching method thereof and the mobile terminal.

Compared with mobile phone having plastic texture, mobile phones having metal texture have features of luxury, nice feel, pressure resistance, and wear resistance and have been hot on the market. Manufacturers continuously increase metal-to-body ratios of mobile phones to satisfy users' demands. However, the metal in an area of an antenna of a mobile phone shields transmission signals. Accordingly, a slot for filled plastic is formed in a whole metal backplate of the mobile phone, so as to isolate the antenna from a peripheral grounded device to guarantee that the antenna can work normally. In this situation that the slot is cut in the area of the antenna of the mobile phone and two ends of the slot are positioned in two sides of the antenna, good performance can be guaranteed only when the mobile phone is in a free space. When a user's hand holds the mobile phone, the user's hand holds the slot. As such, the performance of the mobile phone is deteriorated significantly, and the mobile phone cannot work. A "death grip" occurs. People try to switch a bottom antenna which is died by the user's hand to a top antenna in a top-bottom switching manner, so as to solve the problem that a main antenna is died by the user's hand.

However, in one aspect, with demands of users for high speed-networks and continuously developed communication technologies, multi-input multiple-output (MIMO) antennas have been a main stream on the market. Although the top-bottom switching antenna technology solves the problem that the main antenna is died by the user's hand, a MIMO antenna is still died by the user's hand when the MIMO is switched to the bottom of the mobile phone. The performance is deteriorated significantly, and a bottleneck of restricting the whole receiving performance of the mobile phone is formed. The user's experiences for the high-speed networks are affected significantly. In another aspect, foreign mainstream operators have requirements for both main antennas of mobile phones and diversity/MIMO antennas. Currently, it is compulsive to adopt a CTIA test of wide grip. The top-bottom switching manner cannot solve the authentication problem of the diversity/MIMO antennas.

Consequently, the prior art needs to be improved and developed.

SUMMARY OF THE INVENTION

Embodiments of the present disclosure provide an antenna of a mobile terminal and a switching method thereof and the mobile terminal. Two high-frequency antennas are added in two sides of the mobile terminal. When a top antenna and a bottom antenna are held by a hand, the two high-frequency antennas are switched and one of the top antenna and the bottom antenna is selected as a main antenna. As such, the problem that the mobile terminal is "died" by a hand can be solved.

The present disclosure adopts the following technical schemes to solve the technical problem.

In a first aspect, an embodiment of the present disclosure provides an antenna of a mobile terminal, wherein the antenna of the mobile terminal includes:

a frame, wherein the frame includes four broken slots, two of the broken slots are disposed in a left side of the frame, the other two of the broken slots are disposed in a right side of the frame, and the four broken slots divide the frame into a bottom frame, a top frame, a left frame, and a right frame;

a two-input/two-output switch configured to implement a turn-on function or a turn-off function;

a bottom antenna disposed in the bottom frame and configured to receive signals in a low-frequency band, signals in a middle-frequency band, and signals in a high-frequency band;

a top antenna disposed in the top frame and configured to receive signals in the low-frequency band, signals in the middle-frequency band, and signals in the high-frequency band;

a first high-frequency antenna disposed in the right frame and configured to receive signals in the high-frequency band;

a second high-frequency antenna disposed in the left frame and configured to receive signals in the high-frequency band;

a first selection switch connected to the bottom antenna and disposed in a left side of the bottom frame; and a second selection switch connected to the bottom antenna and disposed in a right side of the bottom frame;

wherein the bottom antenna, the top antenna, the first high-frequency antenna, and the second high-frequency antenna are connected to the two-input/two-output switch.

Further, in the antenna of the mobile terminal, the bottom antenna is connected to a first frequency divider configured to distinguish the signals in the low-frequency and middle-frequency bands from the signals in the high-frequency band.

Further, in the antenna of the mobile terminal, the two-input/two-output switch is connected to the top antenna, a second frequency divider configured to distinguish the signals in the low-frequency and middle-frequency bands from the signals in the high-frequency band, a main chip configured to transmit and receive signals, and a diversity chip configured to receive signals.

Further, in the antenna of the mobile terminal, the diversity chip is connected to the second high-frequency antenna and the first frequency divider and configured to receive the signals in the high-frequency band in the second high-frequency antenna and the signals in the high-frequency band in the first frequency divider.

Further, in the antenna of the mobile terminal, the second frequency divider is connected to the first frequency divider and the first high-frequency antenna and configured to receive the signals in the low-frequency and middle-frequency bands in the first frequency divider and the signals in the high-frequency band in the first high-frequency antenna.

In a second aspect, an embodiment of the present disclosure provides a switching method of an antenna of a mobile terminal, wherein the antenna of the mobile terminal includes:

a frame, wherein the frame includes four broken slots, two of the broken slots are disposed in a left side of the frame, the other two of the broken slots are disposed in a right side of the frame, and the four broken slots divide the frame into a bottom frame, a top frame, a left frame, and a right frame;

a two-input/two-output switch configured to implement a turn-on function or a turn-off function;

a bottom antenna disposed in the bottom frame and configured to receive signals in a low-frequency band, signals in a middle-frequency band, and signals in a high-frequency band;

a top antenna disposed in the top frame and configured to receive signals in the low-frequency band, signals in the middle-frequency band, and signals in the high-frequency band;

a first high-frequency antenna disposed in the right frame and configured to receive signals in the high-frequency band;

a second high-frequency antenna disposed in the left frame and configured to receive signals in the high-frequency band;

a first selection switch connected to the bottom antenna and disposed in a left side of the bottom frame; and a second selection switch connected to the bottom antenna and disposed in a right side of the bottom frame;

wherein the bottom antenna, the top antenna, the first high-frequency antenna, and the second high-frequency antenna are connected to the two-input/two-output switch;

wherein the switching method of the antenna of the mobile terminal includes:

detecting, by the mobile terminal, receiving values of the first high-frequency antenna and the second high-frequency antenna, and determining whether the broken slot of the frame corresponding to the first high-frequency antenna or the second high-frequency antenna is shielded;

when the broken slot corresponding to the first high-frequency antenna or the second high-frequency antenna is shielded, the first selection switch is controlled to be turned on or turned off and the second selection switch is controlled to be turned on or turned off, so that the first high-frequency antenna or the second high-frequency antenna serves as an antenna for transmitting signals in a high-frequency band; and comparing receiving values of the bottom antenna and the top antenna, selecting one of the bottom antenna and the top antenna as a main antenna, and selecting the other one of the bottom antenna and the top antenna as a diversity antenna, wherein the receiving value of the one of the bottom antenna and the top antenna is greater than the receiving value of the other one of the bottom antenna and the top antenna.

In the switching method of the antenna of the mobile terminal, the bottom antenna is connected to a first frequency divider configured to distinguish the signals in the low-frequency and middle-frequency bands from the signals in the high-frequency band.

In the switching method of the antenna of the mobile terminal, the two-input/two-output switch is connected to the top antenna, a second frequency divider configured to distinguish the signals in the low-frequency and middle-frequency bands from the signals in the high-frequency band, a main chip configured to transmit and receive signals, and a diversity chip configured to receive signals.

In the switching method of the antenna of the mobile terminal, the diversity chip is connected to the second high-frequency antenna and the first frequency divider and configured to receive the signals in the high-frequency band in the second high-frequency antenna and the signals in the high-frequency band in the first frequency divider.

In the switching method of the antenna of the mobile terminal, the second frequency divider is connected to the first frequency divider and the first high-frequency antenna and configured to receive the signals in the low-frequency and middle-frequency bands in the first frequency divider and the signals in the high-frequency band in the first high-frequency antenna.

Further, in the switching method of the antenna of the mobile terminal, the step of, the step of, when the broken slot corresponding to the first high-frequency antenna or the second high-frequency antenna is shielded, the first selection switch is controlled to be turned on or turned off and the second selection switch is controlled to be turned on or turned off, so that the first high-frequency antenna or the second high-frequency antenna serves as the antenna for transmitting signals in a high-frequency band, specifically includes the following steps of:

detecting an operating frequency band of the mobile terminal when the broken slot corresponding to the first high-frequency antenna is shielded, wherein the broken slot is a broken slot between the bottom frame and the right frame;

controlling the second selection switch to be turned on and controlling the first selection switch to be turned off when it is detected that the operating frequency band of the mobile terminal is in the low-frequency or middle-frequency bands; and controlling the first selection switch to be turned on and controlling the second selection switch to be turned off when it is detected that the operating frequency band of the mobile terminal is in the high-frequency band.

Further, in the switching method of the antenna of the mobile terminal, the step of, when the broken slot corresponding to the first high-frequency antenna or the second high-frequency antenna is shielded, the first selection switch is controlled to be turned on or turned off and the second selection switch is controlled to be turned on or turned off, so that the first high-frequency antenna or the second high-frequency antenna serves as the antenna for transmitting the signals in the high-frequency band, specifically includes the following steps of:

detecting an operating frequency band of the mobile terminal when the broken slot corresponding to the second high-frequency antenna is shielded, wherein the broken slot is a broken slot between the bottom frame and the left frame;

controlling the first selection switch to be turned on and controlling the second selection switch to be turned off when it is detected that the operating frequency band of the mobile terminal is in the low-frequency or middle-frequency bands; and controlling the second selection switch to be turned on and controlling the first selection switch to be turned off when it is detected that the operating frequency band of the mobile terminal is in the high-frequency band.

Further, in the switching method of the antenna of the mobile terminal, the step of, comparing the receiving values of the bottom antenna and the top antenna, selecting the one of the bottom antenna and the top antenna as the main antenna, and selecting the other one of the bottom antenna and the top antenna as the diversity antenna, wherein the receiving value of the one of the bottom antenna and the top antenna is greater than the receiving value of the other one of the bottom antenna and the top antenna, specifically includes the steps of:

comparing the receiving values of the bottom antenna and the top antenna; and when the receiving value of the bottom antenna is greater than the receiving value of the top antenna, the two-input/two-output switch is controlled to connect the bottom antenna to the main chip to select the bottom antenna as the main antenna and to connect the top antenna to the diversity chip to select the top antenna as the diversity antenna.

Further, in the switching method of the antenna of the mobile terminal, the step of, comparing the receiving values of the bottom antenna and the top antenna, selecting the one of the bottom antenna and the top antenna as the main antenna, and selecting the other one of the bottom antenna and the top antenna as the diversity antenna, wherein the receiving value of the one of the bottom antenna and the top antenna is greater than the receiving value of the other one of the bottom antenna and the top antenna, specifically includes the steps of:

when the receiving value of the top antenna is greater than the receiving value of the bottom antenna, the two-input/two-output switch is controlled to connect the top antenna to the main chip to select the top antenna as the main antenna and to connect the bottom antenna to the diversity chip to select the bottom antenna as the diversity antenna.

In a third aspect, an embodiment of the present disclosure provides a mobile terminal including an antenna, wherein the antenna of the mobile terminal includes:

a frame, wherein the frame includes four broken slots, two of the broken slots are disposed in a left side of the frame, the other two of the broken slots are disposed in a right side of the frame, and the four broken slots divide the frame into a bottom frame, a top frame, a left frame, and a right frame;

a two-input/two-output switch configured to implement a turn-on function or a turn-off function;

a bottom antenna disposed in the bottom frame and configured to receive signals in a low-frequency band, signals in a middle-frequency band, and signals in a high-frequency band;

a top antenna disposed in the top frame and configured to receive signals in the low-frequency band, signals in the middle-frequency band, and signals in the high-frequency band;

a first high-frequency antenna disposed in the right frame and configured to receive signals in the high-frequency band;

a second high-frequency antenna disposed in the left frame and configured to receive signals in the high-frequency band;

a first selection switch connected to the bottom antenna and disposed in a left side of the bottom frame; and a second selection switch connected to the bottom antenna and disposed in a right side of the bottom frame;

wherein the bottom antenna, the top antenna, the first high-frequency antenna, and the second high-frequency antenna are connected to the two-input/two-output switch;

wherein the mobile terminal further includes:

a processor configured to execute instructions; and a storage device configured to store the instructions, and the instructions are configured to be loaded by the processor to perform the following steps of:

detecting, by the mobile terminal, receiving values of the first high-frequency antenna and the second high-frequency antenna, and determining whether the broken slot of the frame corresponding to the first high-frequency antenna or the second high-frequency antenna is shielded;

when the broken slot corresponding to the first high-frequency antenna or the second high-frequency antenna is shielded, the first selection switch is controlled to be turned on or turned off and the second selection switch is controlled to be turned on or turned off, so that the first high-frequency antenna or the second high-frequency antenna serves as an antenna for transmitting signals in a high-frequency band; and comparing receiving values of the bottom antenna and the top antenna, selecting one of the bottom antenna and the top antenna as a main antenna, and selecting the other one of the bottom antenna and the top antenna as a diversity antenna, wherein the receiving value of the one of the bottom antenna and the top antenna is greater than the receiving value of the other one of the bottom antenna and the top antenna.

In the mobile terminal, the bottom antenna is connected to a first frequency divider configured to distinguish the signals in the low-frequency and middle-frequency bands from the signals in the high-frequency band;

the two-input/two-output switch is connected to the top antenna, a second frequency divider configured to distinguish the signals in the low-frequency and middle-frequency bands from the signals in the high-frequency band, a main chip configured to transmit and receive signals, and a diversity chip configured to receive signals;

the diversity chip is connected to the second high-frequency antenna and the first frequency divider and configured to receive the signals in the high-frequency band in the second high-frequency antenna and the signals in the high-frequency band in the first frequency divider; and the second frequency divider is connected to the first frequency divider and the first high-frequency antenna and configured to receive the signals in the low-frequency and middle-frequency bands in the first frequency divider and the signals in the high-frequency band in the first high-frequency antenna.

In the mobile terminal, the step of, when the broken slot corresponding to the first high-frequency antenna or the second high-frequency antenna is shielded, the first selection switch is controlled to be turned on or turned off and the second selection switch is controlled to be turned on or turned off, so that the first high-frequency antenna or the second high-frequency antenna serves as the antenna for transmitting signals in a high-frequency band, specifically includes the following steps of:

detecting an operating frequency band of the mobile terminal when the broken slot corresponding to the first high-frequency antenna is shielded, wherein the broken slot is a broken slot between the bottom frame and the right frame;

controlling the second selection switch to be turned on and controlling the first selection switch to be turned off when it is detected that the operating frequency band of the mobile terminal is in the low-frequency or middle-frequency bands; and controlling the first selection switch to be turned on and controlling the second selection switch to be turned off when it is detected that the operating frequency band of the mobile terminal is in the high-frequency band.

In the mobile terminal, the step of, when the broken slot corresponding to the first high-frequency antenna or the second high-frequency antenna is shielded, the first selection switch is controlled to be turned on or turned off and the second selection switch is controlled to be turned on or turned off, so that the first high-frequency antenna or the second high-frequency antenna serves as the antenna for transmitting the signals in the high-frequency band, specifically includes the following steps of:

detecting an operating frequency band of the mobile terminal when the broken slot corresponding to the second high-frequency antenna is shielded, wherein the broken slot is a broken slot between the bottom frame and the left frame;

controlling the first selection switch to be turned on and controlling the second selection switch to be turned off when it is detected that the operating frequency band of the mobile terminal is in the low-frequency or middle-frequency bands; and controlling the second selection switch to be turned on and controlling the first selection switch to be turned off when it is detected that the operating frequency band of the mobile terminal is in the high-frequency band.

In the mobile terminal, the step of, comparing the receiving values of the bottom antenna and the top antenna, selecting the one of the bottom antenna and the top antenna as the main antenna, and selecting the other one of the bottom antenna and the top antenna as the diversity antenna, wherein the receiving value of the one of the bottom antenna and the top antenna is greater than the receiving value of the other one of the bottom antenna and the top antenna, specifically includes the steps of:

comparing the receiving values of the bottom antenna and the top antenna; and when the receiving value of the bottom antenna is greater than the receiving value of the top antenna, the two-input/two-output switch is controlled to connect the bottom antenna to the main chip to select the bottom antenna as the main antenna and to connect the top antenna to the diversity chip to select the top antenna as the diversity antenna.

In the mobile terminal, the step of, comparing the receiving values of the bottom antenna and the top antenna, selecting the one of the bottom antenna and the top antenna as the main antenna, and selecting the other one of the bottom antenna and the top antenna as the diversity antenna, wherein the receiving value of the one of the bottom antenna and the top antenna is greater than the receiving value of the other one of the bottom antenna and the top antenna, specifically includes the steps of:

when the receiving value of the top antenna is greater than the receiving value of the bottom antenna, the two-input/two-output switch is controlled to connect the top antenna to the main chip to select the top antenna as the main antenna and to connect the bottom antenna to the diversity chip to select the bottom antenna as the diversity antenna.

Advantageous effect is described as follows. The present disclosure provides an antenna of a mobile terminal and a switching method thereof and the mobile terminal. The antenna of the mobile terminal includes: a frame; a two-input/two-output switch configured to perform a turn-on function or a turn-off function; a bottom antenna disposed in a bottom frame and configured to receive signals in a low-frequency band, signals in a middle-frequency band, and signals in a high-frequency band; a top antenna disposed in a top frame and configured to receive signals in the low-frequency band, signals in the middle-frequency band, and signals in the high-frequency band; a first high-frequency antenna disposed in a right frame and configured to receive signals in the high-frequency band; a second high-frequency antenna disposed in a left frame and configured to receive signals in the high-frequency band; a first selection switch connected to the bottom antenna and disposed in a left side of the bottom frame; and a second selection switch connected to the bottom antenna and disposed in a right side of the bottom frame. The two high-frequency antennas are added in two sides of the mobile terminal. When the top antenna and the bottom antenna are held by a hand, the two high-frequency antennas are switched and one of the top antenna and the bottom antenna is selected as a main antenna. As such, the problem that the mobile terminal is "died" by a hand can be solved.

BRIEF DESCRIPTION OF THE SEVERAL VIEWS OF THE DRAWINGS

In FIG. 1: bottom antenna 10, top antenna 20, first high-frequency antenna 30, second high-frequency antenna 40, two-input/two-output switch 50, first selection switch 101, second selection switch 102, first frequency divider 103, second frequency divider 301, diversity chip 501, main chip 502, bottom frame 601, top frame 602, left frame 603, right frame 604.

DESCRIPTION OF SPECIFIC EMBODIMENTS OF THE INVENTION

To make the objectives, technical schemes, and technical effect of the present disclosure more clearly and definitely, the present disclosure will be described in details below by using embodiments in conjunction with the appending drawings. It should be understood that the specific embodiments described herein are merely for explaining the present disclosure but not intended to limit the present disclosure.

Embodiment 1

Figure 1:
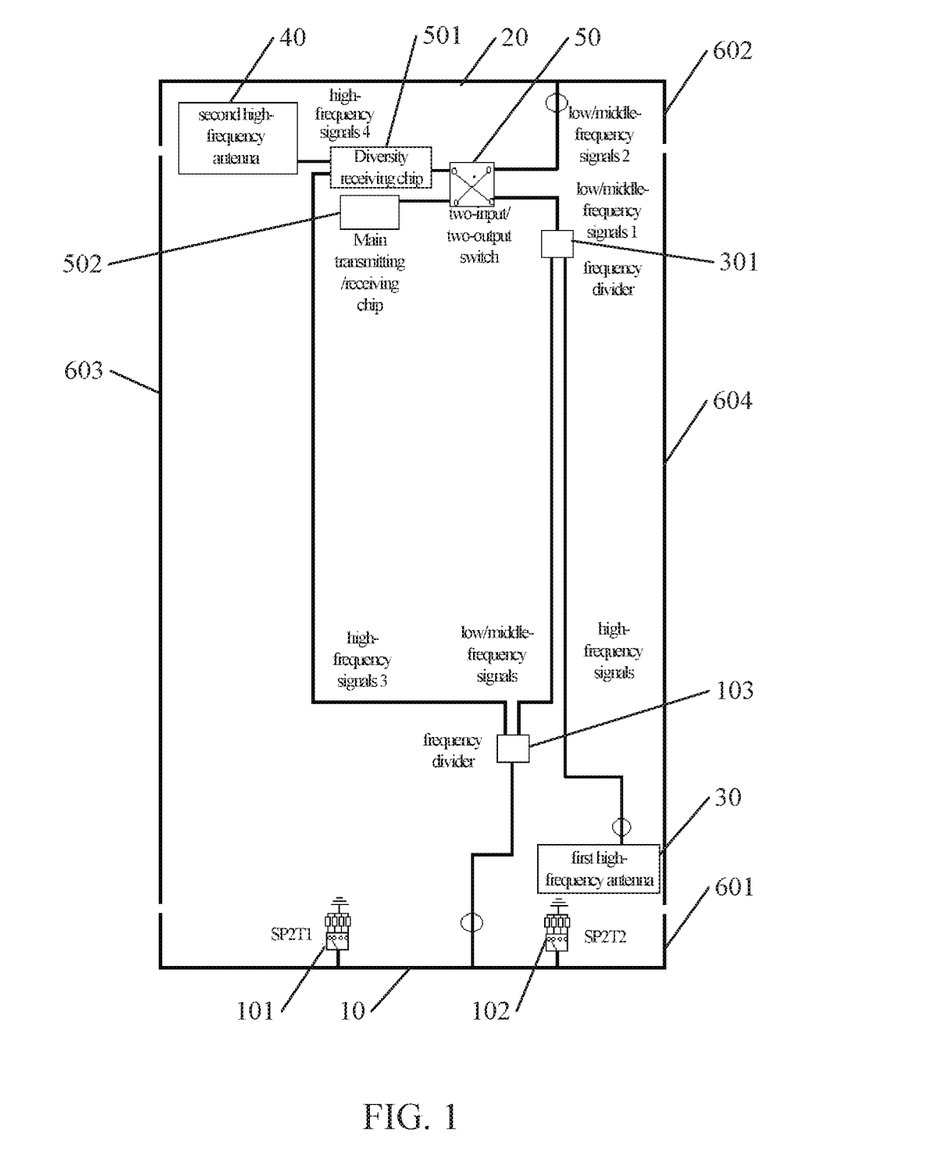
FIG. 1 illustrates a structural diagram of an antenna of a mobile terminal provided by the present disclosure.

Please refer to FIG. 1. FIG. 1 illustrates a structural diagram of an antenna of a mobile terminal provided by the present disclosure. As shown in FIG. 1, the antenna of the mobile terminal of the present embodiment includes:

a frame, wherein the frame includes four broken slots, two of the broken slots are disposed in a left side of the frame, the other two of the broken slots are disposed in a right side of the frame, and the four broken slots divide the frame into a bottom frame 601, a top frame 602, a left frame 603, and a right frame 604;

a bottom antenna 10 disposed in the bottom frame 601 and configured to receive signals in a low-frequency band, signals in a middle-frequency band, and signals in a high-frequency band, a top antenna 20 disposed in the top frame 602 and configured to receive signals in the low-frequency band, signals in the middle-frequency band, and signals in the high-frequency band, a first high-frequency antenna 30 disposed in the right frame 604 and configured to receive signals in the high-frequency band, and a second high-frequency antenna 40 disposed in the left frame 603 and configured to receive signals in the high-frequency band;

a first selection switch 101 disposed in a left side of the bottom frame 601, and the first selection switch 101 connected to the bottom antenna 10; a second selection switch 102 disposed in a right side of the bottom frame 601, and the second selection switch 102 connected to the bottom antenna 10; and a two-input/two-output switch 50 connected to the bottom antenna 10, the top antenna 20, the first high-frequency antenna 30, and the second high-frequency antenna 40, and the two-input/two-output switch 50 configured to control two circuits to be turned on or turned off.

The bottom antenna 10 is connected to a first frequency divider 103 configured to distinguish the signals in the low-frequency and middle-frequency bands from the signals in the high-frequency band, and the first frequency divider 103 is configured to divide the signals received by the bottom antenna 10 into the signals in the low-frequency and middle-frequency bands and the signals in the high-frequency band.

The two-input/two-output switch 50 is connected to the top antenna 20, a second frequency divider 301 configured to distinguish the signals in the low-frequency and middle-frequency bands from the signals in the high-frequency band, a main chip 502 configured to transmit and receive signals, and a diversity chip 501 configured to receive signals.

The diversity chip 501 is connected to the second high-frequency antenna 40 and the first frequency divider 103 and configured to receive the signals in the high-frequency band in the second high-frequency antenna 40 and the signals in the high-frequency band in the first frequency divider 103.

The second frequency divider 301 is connected to the first frequency divider 103 and the first high-frequency antenna 30 and configured to receive the signals in the low-frequency and middle-frequency bands in the first frequency divider 103 and the signals in the high-frequency band in the first high-frequency antenna 30.

An operating principle is described as follows. A ground position of the antenna is selected by controlling a turn-on state and a turn-off state of the first selection switch 101 and a turn-on state and a turn-off state of the second selection switch 102, so that the antenna can be switched in a bilateral symmetry in the low-frequency, middle-frequency, and high-frequency bands. A high-frequency antenna having better performance is selected as one-way antenna of a 4*4 MIMO (Multiple-Input Multiple-Output) antenna. The independent first high-frequency antenna 30 always serves as a high-frequency antenna.

After the bottom antenna 10 is switched in the bilateral symmetry and receiving values of the bottom antenna 10 and the top antenna 20 are compared, the two-input/two-output switch 50 is controlled to select one of the bottom antenna 10 and the top antenna 20 having better performance as a main antenna and to select the other one of the bottom antenna 10 and the top antenna 20 having worse performance as a MIMO antenna.

After the receiving values of the top antenna 20, the first high-frequency antenna 30, and the second high-frequency antenna 40 are compared, one of the top antenna 20, the first high-frequency antenna 30, and the second high-frequency antenna 40 having best performance is selected as a main antenna and one of the top antenna 20, the first high-frequency antenna 30, and the second high-frequency antenna 40 having better performance as a diversity/MIMO antenna.

Embodiment 2

Figure 2:
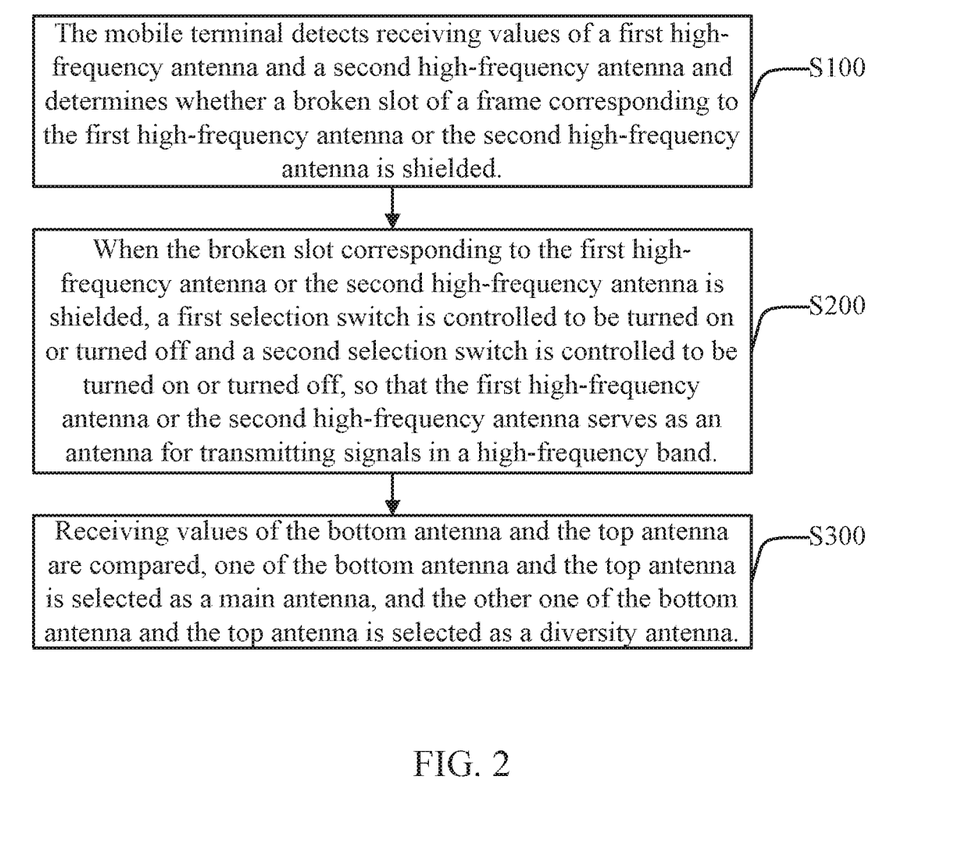
FIG. 2 illustrates a flow chart of a preferred embodiment of a switching method of an antenna of a mobile terminal provided by the present disclosure.

Please refer to FIG. 2. FIG. 2 illustrates a flow chart of a preferred embodiment of a switching method of an antenna of a mobile terminal provided by the present disclosure.

In step S100, the mobile terminal detects receiving values of a first high-frequency antenna and a second high-frequency antenna and determines whether a broken slot of a frame corresponding to the first high-frequency antenna or the second high-frequency antenna is shielded.

In the present embodiment of the present disclosure, the mobile terminal detects the receiving values of the first high-frequency antenna and the second high-frequency antenna, compares the receiving values, and further determines whether the broken slot of the frame corresponding to the first high-frequency antenna or the second high-frequency antenna is shielded. When the antenna of the mobile terminal is held by a hand, the broken slot of the frame corresponding to the first high-frequency antenna or the second high-frequency antenna is shielded. Signals of the antenna are attenuated. Detecting the receiving values can determine whether the corresponding antenna is held by the hand, i.e., is shielded.

In step S200, when the broken slot corresponding to the first high-frequency antenna or the second high-frequency antenna is shielded, a first selection switch is controlled to be turned on or turned off and a second selection switch is controlled to be turned on or turned off, so that the first high-frequency antenna or the second high-frequency antenna serves as an antenna for transmitting signals in a high-frequency band.

In the present embodiment of the present disclosure, when the broken slot between a bottom frame and a right frame is shielded (i.e., when the broken slot in a right side of the mobile terminal is shielded), an operating frequency band of the mobile terminal is detected. When the operating frequency band is in a low-frequency band or a middle-frequency band (i.e., a 2G or 3G network), the second selection switch is controlled to be turned on to be grounded and the first selection switch is controlled to be turned off. Signals in the low-frequency band and the middle-frequency band are received by a bottom antenna and a top antenna.

When the operating frequency band is in the high-frequency band (i.e., a 4G network), the first selection switch is controlled to be turned on to be grounded and the second selection switch is controlled to be turned off. The signals are received by the first high-frequency antenna and the second high-frequency antenna.

In the same manner, when the broken slot between the bottom frame and a left frame is shielded, the operating frequency band of the mobile terminal is detected. The turn-on and turn-off states of the first selection switch and the turn-on and turn-off states of the second selection switch are controlled to be opposite to the above-mentioned turn-on and turn-off states of the first selection switch and the above-mentioned turn-on and turn-off states of the second selection switch.

In detail, step S200 specifically includes the following steps.

In step S201, when the broken slot corresponding to the first high-frequency antenna is shielded, the operating frequency band of the mobile terminal is detected. The broken slot is a broken slot between the bottom frame and the right frame.

In step S202, when it is detected that the operating frequency band of the mobile terminal is in the low-frequency band or the middle-frequency band, the second selection switch is controlled to be turned on and the first selection switch is controlled to be turned off.

In step S203, when it is detected that the operating frequency band of the mobile terminal is in the high-frequency band, the first selection switch is controlled to be turned on and the second selection switch is controlled to be turned off.

When the broken slot corresponding to the second high-frequency antenna is shielded, the switching method further includes the following steps.

In step S204, when the broken slot corresponding to the second high-frequency antenna is shielded, the operating frequency band of the mobile terminal is detected. The broken slot is a broken slot between the bottom frame and a left frame.

In step S205, when it is detected that the operating frequency band of the mobile terminal is in the low-frequency band or the middle-frequency band, the first selection switch is controlled to be turned on and the second selection switch is controlled to be turned off.

In step S206, when it is detected that the operating frequency band of the mobile terminal is in the high-frequency band, the second selection switch is controlled to be turned on and the first selection switch is controlled to be turned off.

In step S300, receiving values of the bottom antenna and the top antenna are compared, one of the bottom antenna and the top antenna is selected as a main antenna, and the other one of the bottom antenna and the top antenna is selected as a diversity antenna. The receiving value of the one of the bottom antenna and the top antenna is greater than the receiving value of the other one of the bottom antenna and the top antenna.

In the present embodiment of the present disclosure, after the bottom antenna and the first high-frequency antenna are switched, the receiving values of the bottom antenna and the top antenna are compared. The one of the bottom antenna and the top antenna is selected as the main antenna. The main antenna is connected to a main chip via a two-input/two-output switch. The other one of the bottom antenna and the top antenna is selected as the diversity antenna (MIMO antenna). The diversity antenna is connected to a diversity chip via the two-input/two-output switch. The receiving value of the one of the bottom antenna and the top antenna is greater than the receiving value of the other one of the bottom antenna and the top antenna.

In detail, step S300 includes the following steps.

In step S301, the receiving values of the bottom antenna and the top antenna are compared.

In step S302, when the receiving value of the bottom antenna is greater than the receiving value of the top antenna, the two-input/two-output switch is controlled to connect the bottom antenna to the main chip to select the bottom antenna as the main antenna and to connect the top antenna to the diversity chip to select the top antenna as the diversity antenna.

In step S303, when the receiving value of the top antenna is greater than the receiving value of the bottom antenna, the two-input/two-output switch is controlled to connect the top antenna to the main chip to select the top antenna as the main antenna and to connect the bottom antenna to the diversity chip to select the bottom antenna as the diversity antenna.

It should be noted that those skilled in the art may understand all or some of the processes in the methods of the embodiments described above can be realized by using programs to instruct corresponding hardware (e.g., a processor, a controller and so on). The programs may be stored in a computer readable storage medium. The programs may include the processes in the methods of the embodiments described above when being executed. The storage medium may include memory, disk, compact disc (CD), or the like.

Figure 3:
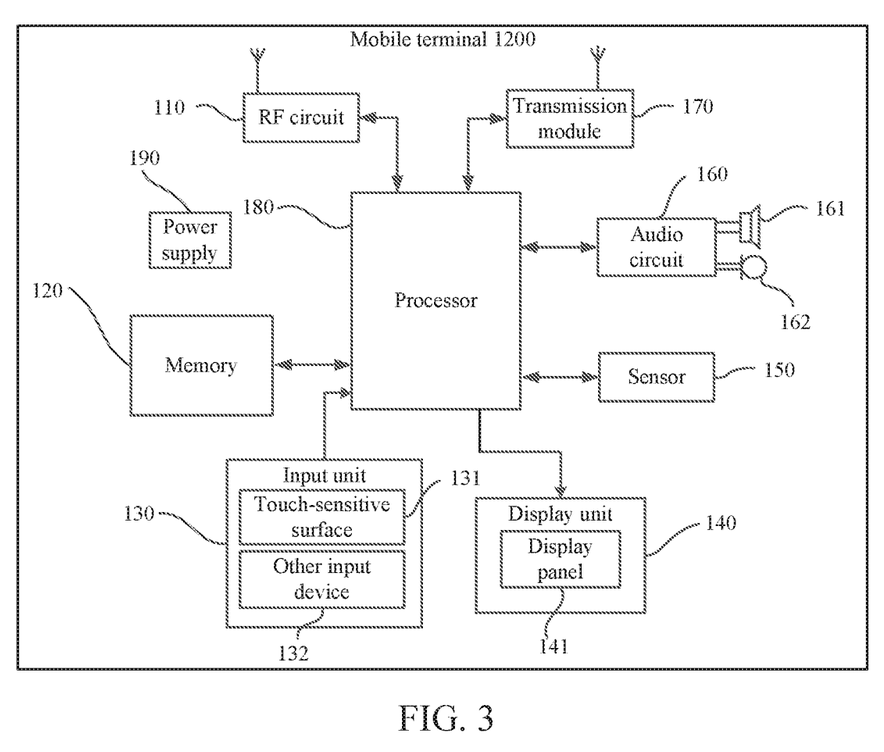
FIG. 3 illustrates a specific structure diagram of a mobile terminal provided by an embodiment of the present disclosure.

FIG. 3 illustrates a specific structure diagram of a mobile terminal provided by an embodiment of the present disclosure. The mobile terminal may be used to implement the switching method of the antenna of the mobile terminal provided by the above-mentioned embodiments. The mobile terminal 1200 may be a smart phone or a tablet computer.

As shown in FIG. 3, the mobile terminal 1200 may include a radio frequency (RF) circuit 110, a memory 120 including one or more computer readable storage mediums (only one is shown in FIG. 3), an input unit 130, a display unit 140, at least one sensor 150, an audio circuit 160, a transmission module 170, a processor 180 including one or more processing cores (only one is shown in FIG. 3), a power supply 190 and the like. Those skilled in the art can understand that the mobile terminal 1200 is not limited to the structure shown in FIG. 3, and may include more or fewer parts than those shown in FIG. 3, or some parts may be combined, or different arrangement of parts may be adopted.

The RF circuit 110 is configured to receive and transmit electromagnetic waves and to realize conversions of the electromagnetic waves and electrical signals, thereby communicating with a communication network or any other device. The RF circuit 110 may include various conventional circuit elements used for performing these functions, for example, an antenna, a radio frequency transmitter, a digital signal processor, an encryption/decryption chip, a subscriber identification module (SIM) card, a memory and the like. The RF circuit 110 may communicate with various networks, for example, an internet, an intranet or a wireless network, or may communicate with any other device via a wireless network. The above-mentioned wireless network may include a cellular telephone network, a wireless local area network or a metropolitan area network. The above-mentioned wireless network may use various communication standards, protocols and technologies and may include but not limited to, Global System of Mobile Communication (GSM), Enhanced Data GSM Environment (EDGE), Wideband Code Division Multiple Access (WCDMA), Code Division Multiple Access (CDMA), Time Division Multiple Access (TDMA), Wireless Fidelity (Wi-Fi, for example, Institute of Electrical and Electronics Engineers (IEEE) 802.11a, IEEE 802.11b, IEEE 802.11g and/or IEEE 802.11n), Voice over Internet Protocol (VoIP) Worldwide Interoperability for Microwave Access (Wi-Max), other protocols for E-mail, instant messaging and Short Messaging Service (SMS) and other suitable communication protocols, and may include protocols which are not developed currently.

The memory 120 may be configured to store software programs and software modules, for example, the program instructions/modules corresponding to the switching method of the antenna of the mobile terminal in accordance with the above-mentioned embodiments. The processor 180 executes various functional applications and data processing (that is, implements the function of the switching of the antenna of the mobile terminal) by operating the software programs and the software modules stored in the memory 120. The memory 120 may include a high speed random access memory and also may include a non-volatile memory, such as one or more disk storage devices, a flash memory device or other non-volatile solid storage devices. In some embodiments, the memory 120 may further include a remote memory disposed corresponding to the processor 180. The remote memory may be connected to the mobile terminal 1200 via a network. Examples of the network include but are not limited to an internet, an intranet, a local area network, a mobile communication network and the combinations of them.

The input unit 130 may be configured to receive input number or character information and to generate keyboard, mouse, joystick, optical or trajectory ball signal inputs related to a user's setting and functional control. In detail, the input unit 130 may include a touch-sensitive surface 131 and other input device 132. The touch-sensitive surface 131, also called a touch display screen or a touch panel, may be configured to detect touch operations of a user on or near the touch-sensitive surface 131 (for example, operations carried out by the user through any suitable objects or attachments, such as a finger, a touch pen and the like, on the touch-sensitive surface 131 or near the touch-sensitive surface 131) and to drive a corresponding device connected therewith according to a preset program. Optionally, the touch-sensitive surface 131 may include a touch detection device and a touch controller. The touch detection device detects the touch direction of the user, detects a signal caused by the touch operation and transmits the signal to the touch controller. The touch controller receives touch information from the touch detection device, converts the touch information into a contact coordinate and then transmits the contact coordinate to the processor 180 and may receive a command transmitted by the processor 180 and execute the command. Moreover, the touch-sensitive surface 131 may be one of various types, such as a resistance type, a capacitance type, an infrared type, a surface acoustic wave type and the like. Besides the touch-sensitive surface 131, the input unit 130 also may include other input device 132. In detail, other input device 132 may include, but is not limited to, one or more of a physical keyboard, function keys (such as a volume control key, a switching key and the like), a trackball, a mouse, a joystick and the like.

The display unit 140 may be configured to display information input by the user or information provided for the user and various graphical user interfaces of the mobile terminal 1200. The graphical user interfaces may be constituted by graphics, texts, icons, videos and any combinations of them. The display unit 140 may include a display panel 141. Optionally, the display panel 141 may be configured in forms of a Liquid Crystal Display (LCD), an Organic Light-Emitting Diode (OLED) and the like. Furthermore, the touch panel 131 may cover the display panel 141. When the touch-sensitive surface 131 detects a touch operation on or near it, the signal caused by the touch operation is transmitted to the processor 180 to determine the type of a touch event. Then, the processor 180 provides a corresponding visual output on the display panel 141 according to the type of the touch event. In FIG. 3, the touch-sensitive surface and the display panel 141 are served as two independent parts for accomplishing input and output functions, however, in some embodiments, the touch-sensitive surface 131 and the display panel 141 may be integrated to accomplish the input and output functions.

The mobile terminal 1200 may further include at least one sensor 150, such as a gyroscope sensor, a magnetic induction sensor, an optical sensor, a motion sensor and other sensors. In detail, the optical sensor may include an environmental light sensor and a proximity sensor. The environmental light sensor may adjust brightness of the display panel 141 according to the lightness of environmental light. The proximity sensor may turn off the display panel 141 and/or backlight when the mobile terminal 1200 approaches an ear. As one type of the motion sensor, an accelerometer sensor may detect the value of an acceleration in each direction (generally in three axial directions), may detect the value and the direction of gravity in a static state, which may be used in posture identifying functions (such as switching between a horizontal screen and a vertical screen, switching related to a game, and calibration on the posture of a magnetometer), vibration identifying functions (such as for pedometer and striking) and the like. Furthermore, a gyroscope, a barometer, a humidity meter, a thermometer, an infrared sensor and other sensors may be integrated into the mobile terminal 1200, and explanations are not repeated herein.

The audio circuit 160, a speaker 161 and a microphone 162 may provide an audio interface between the user and the mobile terminal 1200. The audio circuit 160 may transmit an electric signal obtained by converting received audio data to the speaker 161. The electric signal is converted into a sound signal to be outputted by the speaker 161. On the other hand, the microphone 162 converts a collected sound signal into an electric signal. The audio circuit 160 receives the electric signal and converts the electric signal into audio data. After the audio data is outputted to the processor 180 and is processed, it is transmitted, for example, to another terminal through the RF circuit 110, or is outputted to the memory 120 in order to be further processed. The audio circuit 160 may further include an ear plug hole for providing communication between an external ear phone and the mobile terminal 1200.

The mobile terminal 1200 can help the user to receive and send E-mails, browse webpages, access streaming media and the like by the transmission module 170 (for example, a Wi-Fi module). The transmission module 170 provides wireless broadband internet access for the user. Although the transmission module 170 is shown in FIG. 3, it should be understood that the transmission module 170 is not the necessary part of the mobile terminal 1200 and may completely be omitted as required without changing the scope of the present disclosure.

The processor 180 is a control center of the mobile terminal 1200, is connected with all the parts of the whole mobile phone by various interfaces and lines and is configured to execute various functions of the mobile terminal 1200 and process the data by operating the software programs and/or the modules stored in the memory 120, and to call the data stored in the memory 120 so as to carry out integral monitoring on the mobile phone. Optionally, the processor 180 may include one or more processing cores. In some embodiments, the processor 180 may be integrated with an application processor and a modulation/demodulation processor. The application processor is mainly configured to process an operating system, at least one user interface, at least one application and the like. The modulation/demodulation processor is mainly configured to process wireless communication. It should be understood that the modulation/demodulation processor may also be not integrated into the processor 180.

The mobile terminal 1200 further includes the power supply 190 (such as a battery) for supplying power to each part. In some embodiments, the power supply may be logically connected with the processor 180 by a power supply management system, so as to implement functions of charge management, discharge management, power consumption management and the like by the power supply management system. The power supply 190 may further include one or more direct current or alternating current power supplies, recharging systems, power supply failure detection circuits, power converters or inverters, power supply status indicators and the like.

Although not shown in the FIG. 3, the mobile terminal 1200 may further include a camera (for example, a front camera or a rear camera), a BLUETOOTH module, and the like which are not further described herein. In the present embodiment, the display unit of the mobile terminal is a touch screen display, and the mobile terminal further includes a memory and one or more programs. The one or more programs are stored in the memory and configured to be executed by one or more processors to perform the following operations contained in the one or more programs:

detecting, by the mobile terminal, receiving values of a first high-frequency antenna and a second high-frequency antenna, and determining whether a broken slot of a frame corresponding to the first high-frequency antenna or the second high-frequency antenna is shielded;

when the broken slot corresponding to the first high-frequency antenna or the second high-frequency antenna is shielded, a first selection switch is controlled to be turned on or turned off and a second selection switch is controlled to be turned on or turned off, so that the first high-frequency antenna or the second high-frequency antenna serves as an antenna for transmitting signals in a high-frequency band; and comparing receiving values of a bottom antenna and a top antenna, selecting one of the bottom antenna and the top antenna as a main antenna, and selecting the other one of the bottom antenna and the top antenna as a diversity antenna, wherein the receiving value of the one of the bottom antenna and the top antenna is greater than the receiving value of the other one of the bottom antenna and the top antenna.

In some embodiments, the step of, when the broken slot corresponding to the first high-frequency antenna or the second high-frequency antenna is shielded, the first selection switch is controlled to be turned on or turned off and the second selection switch is controlled to be turned on or turned off, so that the first high-frequency antenna or the second high-frequency antenna serves as the antenna for transmitting the signals in the high-frequency band, specifically includes the following steps of:

detecting an operating frequency band of the mobile terminal when the broken slot corresponding to the first high-frequency antenna is shielded, wherein the broken slot is a broken slot between the bottom frame and a right frame;

controlling the second selection switch to be turned on and controlling the first selection switch to be turned off when it is detected that the operating frequency band of the mobile terminal is in a low-frequency band or a middle-frequency band; and controlling the first selection switch to be turned on and controlling the second selection switch to be turned off when it is detected that the operating frequency band of the mobile terminal is in a high-frequency band.

In some embodiments, the step of, when the broken slot corresponding to the first high-frequency antenna or the second high-frequency antenna is shielded, the first selection switch is controlled to be turned on or turned off and the second selection switch is controlled to be turned on or turned off, so that the first high-frequency antenna or the second high-frequency antenna serves as the antenna for transmitting the signals in the high-frequency band, specifically includes the following steps of:

detecting the operating frequency band of the mobile terminal when the broken slot corresponding to the second high-frequency antenna is shielded, wherein the broken slot is a broken slot between the bottom frame and a left frame;

controlling the first selection switch to be turned on and controlling the second selection switch to be turned off when it is detected that the operating frequency band of the mobile terminal is in the low-frequency band or the middle-frequency band; and controlling the second selection switch to be turned on and controlling the first selection switch to be turned off when it is detected that the operating frequency band of the mobile terminal is in the high-frequency band.

In some embodiments, the step of, comparing the receiving values of the bottom antenna and the top antenna, selecting the one of the bottom antenna and the top antenna as the main antenna, and selecting the other one of the bottom antenna and the top antenna as the diversity antenna, wherein the receiving value of the one of the bottom antenna and the top antenna is greater than the receiving value of the other one of the bottom antenna and the top antenna, specifically includes the steps of:

comparing the receiving values of the bottom antenna and the top antenna; and when the receiving value of the bottom antenna is greater than the receiving value of the top antenna, the two-input/two-output switch is controlled to connect the bottom antenna to the main chip to select the bottom antenna as the main antenna and to connect the top antenna to the diversity chip to select the top antenna as the diversity antenna.

In some embodiments, the step of, comparing the receiving values of the bottom antenna and the top antenna, selecting the one of the bottom antenna and the top antenna as the main antenna, and selecting the other one of the bottom antenna and the top antenna as the diversity antenna, wherein the receiving value of the one of the bottom antenna and the top antenna is greater than the receiving value of the other one of the bottom antenna and the top antenna, specifically includes the steps of:

when the receiving value of the top antenna is greater than the receiving value of the bottom antenna, the two-input/two-output switch is controlled to connect the top antenna to the main chip to select the top antenna as the main antenna and to connect the bottom antenna to the diversity chip to select the bottom antenna as the diversity antenna.

In summary, the present disclosure provides an antenna of a mobile terminal and a switching method thereof and the mobile terminal. The antenna of the mobile terminal includes: a frame; a two-input/two-output switch configured to perform a turn-on function or a turn-off function; a bottom antenna disposed in a bottom frame and configured to receive signals in a low-frequency band, signals in a middle-frequency band, and signals in a high-frequency band; a top antenna disposed in a top frame and configured to receive signals in the low-frequency band, signals in the middle-frequency band, and signals in the high-frequency band; a first high-frequency antenna disposed in a right frame and configured to receive signals in the high-frequency band; a second high-frequency antenna disposed in a left frame and configured to receive signals in the high-frequency band; a first selection switch connected to the bottom antenna and disposed in a left side of the bottom frame; and a second selection switch connected to the bottom antenna and disposed in a right side of the bottom frame. The two high-frequency antennas are added in two sides of the mobile terminal. When the top antenna and the bottom antenna are held by a hand, the two high-frequency antennas are switched and one of the top antenna and the bottom antenna is selected as a main antenna. As such, the problem that the mobile terminal is "died" by a hand can be solved.

It should be understood that present disclosure is not limited to the exemplary examples. Those skilled in the art in the art may achieve equivalent improvements or replacements according to the above description. The equivalent improvements and replacements should be considered to belong to the protection scope of the present disclosure.

What is claimed is:

1. An antenna of a mobile terminal, wherein the antenna of the mobile terminal comprises:
   a frame, wherein the frame comprises four broken slots, two of the broken slots are disposed in a left side of the frame, the other two of the broken slots are disposed in a right side of the frame, and the four broken slots divide the frame into a bottom frame, a top frame, a left frame, and a right frame;
   a two-input/two-output switch configured to implement a turn-on function or a turn-off function;
   a bottom antenna disposed in the bottom frame and configured to receive signals in a low-frequency band, signals in a middle-frequency band, and signals in a high-frequency band;
   a top antenna disposed in the top frame and configured to receive signals in the low-frequency band, signals in the middle-frequency band, and signals in the high-frequency band;
   a first high-frequency antenna disposed in the right frame and configured to receive signals in the high-frequency band;
   a second high-frequency antenna disposed in the left frame and configured to receive signals in the high-frequency band;
   a first selection switch connected to the bottom antenna and disposed in a left side of the bottom frame; and
   a second selection switch connected to the bottom antenna and disposed in a right side of the bottom frame;
   wherein the bottom antenna, the top antenna, the first high-frequency antenna, and the second high-frequency antenna are connected to the two-input/two-output switch.

2. The antenna of the mobile terminal of claim 1, wherein the bottom antenna is connected to a first frequency divider configured to distinguish the signals in the low-frequency and middle-frequency bands from the signals in the high-frequency band.

3. The antenna of the mobile terminal of claim 1, wherein the two-input/two-output switch is connected to the top antenna, a second frequency divider configured to distinguish the signals in the low-frequency and middle-frequency bands from the signals in the high-frequency band, a main chip configured to transmit and receive signals, and a diversity chip configured to receive signals.

4. The antenna of the mobile terminal of claim 3, wherein the diversity chip is connected to the second high-frequency antenna and the first frequency divider and configured to receive the signals in the high-frequency band in the second high-frequency antenna and the signals in the high-frequency band in the first frequency divider.

5. The antenna of the mobile terminal of claim 3, wherein the second frequency divider is connected to the first frequency divider and the first high-frequency antenna and configured to receive the signals in the low-frequency and middle-frequency bands in the first frequency divider and the signals in the high-frequency band in the first high-frequency antenna.

6. A switching method of an antenna of a mobile terminal, wherein the antenna of the mobile terminal comprises:
   a frame, wherein the frame comprises four broken slots, two of the broken slots are disposed in a left side of the frame, the other two of the broken slots are disposed in a right side of the frame, and the four broken slots divide the frame into a bottom frame, a top frame, a left frame, and a right frame;
   a two-input/two-output switch configured to implement a turn-on function or a turn-off function;
   a bottom antenna disposed in the bottom frame and configured to receive signals in a low-frequency band, signals in a middle-frequency band, and signals in a high-frequency band;
   a top antenna disposed in the top frame and configured to receive signals in the low-frequency band, signals in the middle-frequency band, and signals in the high-frequency band;
   a first high-frequency antenna disposed in the right frame and configured to receive signals in the high-frequency band;
   a second high-frequency antenna disposed in the left frame and configured to receive signals in the high-frequency band;
   a first selection switch connected to the bottom antenna and disposed in a left side of the bottom frame; and
   a second selection switch connected to the bottom antenna and disposed in a right side of the bottom frame;
   wherein the bottom antenna, the top antenna, the first high-frequency antenna, and the second high-frequency antenna are connected to the two-input/two-output switch;
   wherein the switching method of the antenna of the mobile terminal comprises:
   detecting, by the mobile terminal, receiving values of the first high-frequency antenna and the second high-frequency antenna, and determining, by the mobile terminal, whether the broken slot of the frame corresponding to the first high-frequency antenna or the second high-frequency antenna is shielded;
   when the broken slot corresponding to the first high-frequency antenna or the second high-frequency antenna is shielded, the first selection switch is controlled to be turned on or turned off and the second selection switch is controlled to be turned on or turned off, so that the first high-frequency antenna or the second high-frequency antenna serves as an antenna for transmitting signals in a high-frequency band; and
   comparing receiving values of the bottom antenna and the top antenna, selecting one of the bottom antenna and the top antenna as a main antenna, and selecting the other one of the bottom antenna and the top antenna as a diversity antenna, wherein the receiving value of the one of the bottom antenna and the top antenna is greater than the receiving value of the other one of the bottom antenna and the top antenna.

7. The switching method of the antenna of the mobile terminal of claim 6, wherein the bottom antenna is connected to a first frequency divider configured to distinguish the signals in the low-frequency and middle-frequency bands from the signals in the high-frequency band.

8. The switching method of the antenna of the mobile terminal of claim 7, wherein the two-input/two-output switch is connected to the top antenna, a second frequency divider configured to distinguish the signals in the low-frequency and middle-frequency bands from the signals in the high-frequency band, a main chip configured to transmit and receive signals, and a diversity chip configured to receive signals.

9. The switching method of the antenna of the mobile terminal of claim 8, wherein the diversity chip is connected to the second high-frequency antenna and the first frequency divider and configured to receive the signals in the high-frequency band in the second high-frequency antenna and the signals in the high-frequency band in the first frequency divider.

10. The switching method of the antenna of the mobile terminal of claim 9, wherein the second frequency divider is connected to the first frequency divider and the first high-frequency antenna and configured to receive the signals in the low-frequency and middle-frequency bands in the first frequency divider and the signals in the high-frequency band in the first high-frequency antenna.

11. The switching method of the antenna of the mobile terminal of claim 10, wherein the step of, when the broken slot corresponding to the first high-frequency antenna or the second high-frequency antenna is shielded, the first selection switch is controlled to be turned on or turned off and the second selection switch is controlled to be turned on or turned off, so that the first high-frequency antenna or the second high-frequency antenna serves as the antenna for transmitting signals in a high-frequency band, comprises the following steps of:

detecting an operating frequency band of the mobile terminal when the broken slot corresponding to the first high-frequency antenna is shielded, wherein the broken slot is a broken slot between the bottom frame and the right frame;

controlling the second selection switch to be turned on and controlling the first selection switch to be turned off when it is detected that the operating frequency band of the mobile terminal is in the low-frequency or middle-frequency bands; and controlling the first selection switch to be turned on and controlling the second selection switch to be turned off when it is detected that the operating frequency band of the mobile terminal is in the high-frequency band.

12. The switching method of the antenna of the mobile terminal of claim 10, wherein the step of, when the broken slot corresponding to the first high-frequency antenna or the second high-frequency antenna is shielded, the first selection switch is controlled to be turned on or turned off and the second selection switch is controlled to be turned on or turned off, so that the first high-frequency antenna or the second high-frequency antenna serves as the antenna for transmitting the signals in the high-frequency band, comprises the following steps of:

detecting an operating frequency band of the mobile terminal when the broken slot corresponding to the second high-frequency antenna is shielded, wherein the broken slot is a broken slot between the bottom frame and the left frame;

controlling the first selection switch to be turned on and controlling the second selection switch to be turned off when it is detected that the operating frequency band of the mobile terminal is in the low-frequency or middle-frequency bands; and controlling the second selection switch to be turned on and controlling the first selection switch to be turned off when it is detected that the operating frequency band of the mobile terminal is in the high-frequency band.

13. The switching method of the antenna of the mobile terminal of claim 10, wherein the step of, comparing the receiving values of the bottom antenna and the top antenna, selecting the one of the bottom antenna and the top antenna as the main antenna, and selecting the other one of the bottom antenna and the top antenna as the diversity antenna, wherein the receiving value of the one of the bottom antenna and the top antenna is greater than the receiving value of the other one of the bottom antenna and the top antenna, comprises the steps of:

comparing the receiving values of the bottom antenna and the top antenna; and when the receiving value of the bottom antenna is greater than the receiving value of the top antenna, the two-input/two-output switch is controlled to connect the bottom antenna to the main chip to select the bottom antenna as the main antenna and to connect the top antenna to the diversity chip to select the top antenna as the diversity antenna.

14. The switching method of the antenna of the mobile terminal of claim 10, wherein the step of, comparing the receiving values of the bottom antenna and the top antenna, selecting the one of the bottom antenna and the top antenna as the main antenna, and selecting the other one of the bottom antenna and the top antenna as the diversity antenna, wherein the receiving value of the one of the bottom antenna and the top antenna is greater than the receiving value of the other one of the bottom antenna and the top antenna, comprises the steps of:

comparing the receiving values of the bottom antenna and the top antenna; and when the receiving value of the top antenna is greater than the receiving value of the bottom antenna, the two-input/two-output switch is controlled to connect the top antenna to the main chip to select the top antenna as the main antenna and to connect the bottom antenna to the diversity chip to select the bottom antenna as the diversity antenna.

15. A mobile terminal, comprising an antenna, wherein the antenna of the mobile terminal comprises:

a frame, wherein the frame comprises four broken slots, two of the broken slots are disposed in a left side of the frame, the other two of the broken slots are disposed in a right side of the frame, and the four broken slots divide the frame into a bottom frame, a top frame, a left frame, and a right frame;

a two-input/two-output switch configured to implement a turn-on function or a turn-off function;

a bottom antenna disposed in the bottom frame and configured to receive signals in a low-frequency band, signals in a middle-frequency band, and signals in a high-frequency band;

a top antenna disposed in the top frame and configured to receive signals in the low-frequency band, signals in the middle-frequency band, and signals in the high-frequency band;

a first high-frequency antenna disposed in the right frame and configured to receive signals in the high-frequency band;

a second high-frequency antenna disposed in the left frame and configured to receive signals in the high-frequency band;

a first selection switch connected to the bottom antenna and disposed in a left side of the bottom frame; and a second selection switch connected to the bottom antenna and disposed in a right side of the bottom frame;

wherein the bottom antenna, the top antenna, the first high-frequency antenna, and the second high-frequency antenna are connected to the two-input/two-output switch;

wherein the mobile terminal further comprises:
a processor configured to execute instructions; and
a storage device configured to store the instructions, and the instructions are configured to be loaded by the processor to perform the following steps of:
detecting, by the mobile terminal, receiving values of the first high-frequency antenna and the second high-frequency antenna, and determining, by the mobile terminal, whether the broken slot of the frame corresponding to the first high-frequency antenna or the second high-frequency antenna is shielded;
when the broken slot corresponding to the first high-frequency antenna or the second high-frequency antenna is shielded, the first selection switch is controlled to be turned on or turned off and the second selection switch is controlled to be turned on or turned off, so that the first high-frequency antenna or the second high-frequency antenna serves as an antenna for transmitting signals in a high-frequency band; and
comparing receiving values of the bottom antenna and the top antenna, selecting one of the bottom antenna and the top antenna as a main antenna, and selecting the other one of the bottom antenna and the top antenna as a diversity antenna, wherein the receiving value of the one of the bottom antenna and the top antenna is greater than the receiving value of the other one of the bottom antenna and the top antenna.

16. The mobile terminal of claim 15, wherein the bottom antenna is connected to a first frequency divider configured to distinguish the signals in the low-frequency and middle-frequency bands from the signals in the high-frequency band;
the two-input/two-output switch is connected to the top antenna, a second frequency divider configured to distinguish the signals in the low-frequency and middle-frequency bands from the signals in the high-frequency band, a main chip configured to transmit and receive signals, and a diversity chip configured to receive signals;
the diversity chip is connected to the second high-frequency antenna and the first frequency divider and configured to receive the signals in the high-frequency band in the second high-frequency antenna and the signals in the high-frequency band in the first frequency divider; and
the second frequency divider is connected to the first frequency divider and the first high-frequency antenna and configured to receive the signals in the low-frequency and middle-frequency bands in the first frequency divider and the signals in the high-frequency band in the first high-frequency antenna.

17. The mobile terminal of claim 16, wherein the step of, when the broken slot corresponding to the first high-frequency antenna or the second high-frequency antenna is shielded, the first selection switch is controlled to be turned on or turned off and the second selection switch is controlled to be turned on or turned off, so that the first high-frequency antenna or the second high-frequency antenna serves as the antenna for transmitting signals in a high-frequency band, comprises the following steps of:
detecting an operating frequency band of the mobile terminal when the broken slot corresponding to the first high-frequency antenna is shielded, wherein the broken slot is a broken slot between the bottom frame and the right frame;
controlling the second selection switch to be turned on and controlling the first selection switch to be turned off when it is detected that the operating frequency band of the mobile terminal is in the low-frequency or middle-frequency bands; and
controlling the first selection switch to be turned on and controlling the second selection switch to be turned off when it is detected that the operating frequency band of the mobile terminal is in the high-frequency band.

18. The mobile terminal of claim 16, wherein the step of, when the broken slot corresponding to the first high-frequency antenna or the second high-frequency antenna is shielded, the first selection switch is controlled to be turned on or turned off and the second selection switch is controlled to be turned on or turned off, so that the first high-frequency antenna or the second high-frequency antenna serves as the antenna for transmitting the signals in the high-frequency band, comprises the following steps of:
detecting an operating frequency band of the mobile terminal when the broken slot corresponding to the second high-frequency antenna is shielded, wherein the broken slot is a broken slot between the bottom frame and the left frame;
controlling the first selection switch to be turned on and controlling the second selection switch to be turned off when it is detected that the operating frequency band of the mobile terminal is in the low-frequency or middle-frequency bands; and
controlling the second selection switch to be turned on and controlling the first selection switch to be turned off when it is detected that the operating frequency band of the mobile terminal is in the high-frequency band.

19. The mobile terminal of claim 16, wherein the step of, comparing the receiving values of the bottom antenna and the top antenna, selecting the one of the bottom antenna and the top antenna as the main antenna, and selecting the other one of the bottom antenna and the top antenna as the diversity antenna, wherein the receiving value of the one of the bottom antenna and the top antenna is greater than the receiving value of the other one of the bottom antenna and the top antenna, comprises the steps of:
comparing the receiving values of the bottom antenna and the top antenna; and
when the receiving value of the bottom antenna is greater than the receiving value of the top antenna, the two-input/two-output switch is controlled to connect the bottom antenna to the main chip to select the bottom antenna as the main antenna and to connect the top antenna to the diversity chip to select the top antenna as the diversity antenna.

20. The mobile terminal of claim 16, wherein the step of, comparing the receiving values of the bottom antenna and the top antenna, selecting the one of the bottom antenna and the top antenna as the main antenna, and selecting the other one of the bottom antenna and the top antenna as the diversity antenna, wherein the receiving value of the one of the bottom antenna and the top antenna is greater than the receiving value of the other one of the bottom antenna and the top antenna, comprises the steps of:
comparing the receiving values of the bottom antenna and the top antenna; and
when the receiving value of the top antenna is greater than the receiving value of the bottom antenna, the two-input/two-output switch is controlled to connect the top antenna to the main chip to select the top antenna as the main antenna and to connect the bottom antenna to the diversity chip to select the bottom antenna as the diversity antenna.

* * * * *